US012159761B2

(12) United States Patent
Lee et al.

(10) Patent No.: US 12,159,761 B2
(45) Date of Patent: Dec. 3, 2024

(54) VEHICLE PUSH SWITCH UNIT AND MANUFACTURING METHOD THEREFOR

(71) Applicant: LS AUTOMOTIVE TECHNOLOGIES CO., LTD., Anyang-si (KR)

(72) Inventors: Gyu Tae Lee, Seoul (KR); Ki Nyeong Ko, Seoul (KR); Du Sik Park, Daegu (KR)

(73) Assignee: LS AUTOMOTIVE TECHNOLOGIES CO., LTD., Anyang-si (KR)

( * ) Notice: Subject to any disclaimer, the term of this patent is extended or adjusted under 35 U.S.C. 154(b) by 154 days.

(21) Appl. No.: 17/799,502

(22) PCT Filed: Feb. 15, 2021

(86) PCT No.: PCT/KR2021/001926

§ 371 (c)(1),
(2) Date: Aug. 12, 2022

(87) PCT Pub. No.: WO2021/162531

PCT Pub. Date: Aug. 19, 2021

(65) Prior Publication Data

US 2023/0073675 A1 Mar. 9, 2023

(30) Foreign Application Priority Data

Feb. 13, 2020 (KR) ........................ 10-2020-0017335
Feb. 15, 2021 (KR) ........................ 10-2021-0020140

(51) Int. Cl.
*H01H 13/14* (2006.01)
*H01H 13/20* (2006.01)

(52) U.S. Cl.
CPC ............ *H01H 13/14* (2013.01); *H01H 13/20* (2013.01)

(58) Field of Classification Search
CPC .. H01H 13/14; H01H 13/20; H01H 2221/062; H01H 3/60; H01H 13/02
See application file for complete search history.

(56) References Cited

U.S. PATENT DOCUMENTS 6,857,357 B2 * 2/2005 Fujii .................... H01H 23/143 100/339
7,041,923 B2 * 5/2006 Lin ........................ H01H 3/122 200/341
2010/0089736 A1 * 4/2010 Tsai ..................... H01H 13/705 200/344

FOREIGN PATENT DOCUMENTS

| | | | |
|---|---|---|---|
| JP | H0641039 | U | 5/1994 |
| KR | 1020100058040 | A | 6/2010 |
| KR | 1020110006114 | A | 1/2011 |
| KR | 1020160053237 | A | 5/2016 |
| KR | 2020160003873 | U | 11/2016 |

* cited by examiner

*Primary Examiner* — Lheiren Mae A Caroc
(74) *Attorney, Agent, or Firm* — Rabin & Berdo, P.C.

(57) ABSTRACT

The present invention provides a vehicle push switch unit (10) comprising: a unit housing (100) mounted in a vehicle; and a unit switch part (300) including a unit switch moving block (320) movably mounted in the unit housing (100), and a unit switch (310) for changing a switching operation signal according to the movement of the unit switch moving block (320), wherein the unit switch moving block (320) and the unit housing (100) have unit stopper parts (500), and at least a portion of the unit stopper part (500) is injection-molded.

16 Claims, 14 Drawing Sheets

VEHICLE PUSH SWITCH UNIT AND MANUFACTURING METHOD THEREFOR

TECHNICAL FIELD

The present invention relates to a switch installed in a vehicle, and more particularly, to a push type vehicular switch which implements a combined operation thereof through a simple and compact structure.

BACKGROUND ART

A vehicle such as an automobile or the like is required to be provided with functions of various kinds of convenient means for offering a more stable and comfortable driving state to a user, beyond a function of the vehicle as a means of transportation. Thus, the vehicle is equipped with various convenient devices, and a variety of kinds of switches for operating and controlling such convenient devices.

In general, when an operation in opposite directions is required to be selected, a seesaw switch device or a sliding switch device is used which allows a vertical movement, e.g., an opening/closing operation of a vehicle window to be performed in response to the operation of a front end part and a rear end part of the switch device. When each operation mode is required to be selected, a rotary switch is used. In particular, since various switch devices and vehicle amenities are installed around a driver's seat, the switch devices are required to be compact, and thus a design for prevention of interference between the switch devices is essential.

Meanwhile, a conventional push switch may further include a constituent element such as a damper to prevent a noise from being generated during a push and/or return operation. However, the conventional push switch entails a problem in that a moving block and the damper as constituent elements movable by an individual mold are manufactured, respectively, and then inserted and mounted as a manual assembly structure, which makes it difficult to precisely implement damper standards during an actual push and/or return operation, and thus a contact error may occur in the case of contact with a movable element, resulting in generation of noises, occurrence of shocks, or implementation of tilt operation.

DISCLOSURE OF INVENTION

Technical Problem

Accordingly, the present invention has been made to solve the above-mentioned problems occurring in the prior art, and it is an object of the present invention to provide a push switch unit for a vehicle, which includes an integral damper having a compact and simple double-shot injection-molded structure to prevent or minimize the possibility of occurrence of an unnecessary noise/vibration/erroneous operation due to error generation through more accurate injection molding, thereby enhancing both operability and maintenance and repair performance of the push switch unit and thus improving manipulation reliability thereof.

Technical Solution

To achieve the above object, in one aspect, the present invention provides a push switch unit (10) for a vehicle, including: a unit housing (100); a unit switch section (300) including a unit switch moving block (320) movably mounted in the unit housing (100), and a unit switch (310) for changing a switching operation signal in response to the movement of the unit switch moving block (320); and a unit stopper section (500) provided at the unit switch moving block (320) and the unit housing (100), wherein the unit stopper section (500) is at least partially injection-molded.

In the push switch unit for a vehicle, the unit stopper section (500) may include: a unit stopper (520) disposed within the unit housing (100); and a unit stopper corresponding part (510) disposed at the unit switch moving block (320) so as to correspond to a position of the unit stopper (520). The unit stopper corresponding part (510) may be injection-molded.

In the push switch unit for a vehicle, the unit switch moving block (320) may include: a unit switch moving block body (325) movably disposed within the unit switch section (300); and a unit switch moving block base (321) disposed at the other end of the unit switch moving block body (325) to move the unit switch (310). The unit stopper corresponding part (510) may be disposed in the unit switch moving block base (321).

In the push switch unit for a vehicle, the unit switch moving block base (321) may include a unit stopper corresponding part-mounting part (323) formed therein to allow the unit stopper corresponding part (510) to be disposed in the unit stopper corresponding part-mounting part (323), and the unit stopper corresponding part-mounting part (323) may at least partially include a unit stopper corresponding part-mounting extension part (3233) having a length in a direction intersecting the moving direction of the unit switch moving block (320).

In the push switch unit for a vehicle, the unit switch moving block base (321) may include a unit stopper corresponding part-mounting part (323) formed therein to allow the unit stopper corresponding part (510) to be disposed in the unit stopper corresponding part-mounting part (323), and the unit stopper corresponding part-mounting part (323) may at least partially include a unit stopper corresponding part-mounting extension part (3233) having a length in a direction intersecting the moving direction of the unit switch moving block (320).

In the push switch unit for a vehicle, the unit switch moving block base (321) may include a unit stopper corresponding part-mounting part (323) formed therein to allow the unit stopper corresponding part (510) to be disposed in the unit stopper corresponding part-mounting part (323). The unit stopper corresponding part-mounting part (323) may include: a unit stopper corresponding part-mounting extension part (3233) having a length in the moving direction of the unit switch moving block (320); and a unit stopper corresponding part-mounting confrontation part (3239) formed in an opposite manner such that the unit switch moving block (320) is positioned, and connected to the unit stopper-corresponding part-mounting extension part (3233). The unit stopper corresponding part-mounting confrontation part (3239) and the unit stopper corresponding part-mounting extension part (3233) may be non-overlapped when projected onto a plane perpendicular to the moving direction of the unit switch moving block (320).

In the push switch unit for a vehicle, the unit stopper corresponding part (510) may be disposed in plural numbers so as to be spaced apart from each other in the unit switch moving block base (321).

In the push switch unit for a vehicle, the unit stopper corresponding part (510) may be at least partially disposed in the unit switch moving block base (321) in such a manner as to be symmetrically positioned on a plane including the moving direction of the unit switch moving block (320).

In the push switch unit for a vehicle, the unit stopper corresponding part (510) may be at least partially disposed in the unit switch moving block base (321) in a fluidic communication manner.

In the push switch unit for a vehicle, the unit switch moving block base (321) may include a unit stopper corresponding part-mounting part (323) formed therein to allow the unit stopper corresponding part (510) to be disposed in the unit stopper corresponding part-mounting part (323), and the unit stopper corresponding part-mounting part (323) may include a unit stopper-corresponding part-mounting injection part (3231) formed on an opposite surface to one surface of the unit switch moving block base (321), which faces the unit stopper corresponding part (510).

In the push switch unit (10) for a vehicle, the unit switch (310) may include: a unit switch fixed part (311) disposed on a unit substrate (200); and a unit switch movable part (313) configured to be moved to a position corresponding to the unit switch fixed part (311) by the unit switch moving block (320).

In the push switch unit for a vehicle, the unit substrate (200) may allow a unit rubber pad (301) to be disposed on surface thereof, wherein the unit switch (310) may include a unit switch rubber movable part (330) disposed on the unit rubber pad (301), wherein the unit switch rubber movable part (330) may include: a unit switch movable contact (331) configured to be contactable with the unit switch moving block base (321); a unit switch movable support (333) disposed on the unit rubber pad (301); and a unit switch movable connection (332) contactingly connected at one end thereof to the unit switch movable contact (331) and at the other end thereof to the unit switch movable support (333), and wherein the unit switch movable part (313) is disposed at an inner bottom end of the unit switch movable contact (331).

In the push switch unit for a vehicle, the unit stopper corresponding part (510) may include: a unit stopper corresponding contact (511) configured to be contactable with the unit stopper (520); a unit stopper corresponding extension (513) disposed at a side opposite to the unit stopper corresponding contact (511); and a unit stopper corresponding contact connection (515) configured to interconnect the unit stopper corresponding contact (511) and the unit stopper corresponding extension (513).

In the push switch unit for a vehicle, the unit stopper corresponding contact (511) and the unit stopper corresponding extension (513) may have a projection region different from that of the unit stopper corresponding contact connection 515 when projected onto a plane perpendicular to the moving direction of the unit switch moving block (320).

In the push switch unit for a vehicle, the unit switch moving block base (321) may include a unit stopper corresponding part-mounting part (323) formed therein to allow the unit stopper corresponding part (510) to be disposed in the unit stopper corresponding part-mounting part (323), wherein the unit stopper corresponding part-mounting part (323) may at least partially have a length in a direction intersecting the moving direction of the unit switch moving block (320), and wherein the unit stopper corresponding part-mounting part (323) may at least partially have a length in a direction parallel with the moving direction of the unit switch moving block (320).

In another aspect, the present invention provides a method of manufacturing a push switch unit (10) for a vehicle, wherein the push switch unit includes: a unit housing (100); a unit switch section (300) including a unit switch moving block (320) movably mounted in the unit housing (100), and a unit switch (310) for changing a switching operation signal in response to the movement of the unit switch moving block (320); and a unit stopper section (500) provided at the unit switch moving block (320) and the unit housing (100), and wherein the unit stopper section (500) is at least partially injection-molded.

In the method of manufacturing a push switch unit for a vehicle, the unit stopper section (500) may include: a unit stopper (520) disposed within the unit housing (100); and a unit stopper corresponding part (510) disposed at the unit switch moving block (320) so as to correspond to a position of the unit stopper (520), and the unit stopper corresponding part (510) may be injection-molded.

In the method of manufacturing a push switch unit for a vehicle, the method may include: a first injection molding step of forming the unit stopper corresponding part-mounting part (323) in the unit switch moving block base (321) of the unit switch moving block (320); and a second injection molding step of injecting a material for forming the unit stopper corresponding part 510 into the unit stopper corresponding part-mounting part (323).

In the method of manufacturing a push switch unit for a vehicle, the unit stopper corresponding part (510) formed through the first injection molding step and the second injection molding step may include: a unit stopper corresponding contact (511) configured to be contactable with the unit stopper (520); a unit stopper corresponding extension (513) disposed at a side opposite to the unit stopper corresponding contact (511), and having a projection region different from that of the unit stopper corresponding contact (511) when projected onto a plane perpendicular to the moving direction of the unit switch moving block (320); and a unit stopper corresponding contact connection (515) configured to interconnect the unit stopper corresponding contact (511) and the unit stopper corresponding extension (513). The first injection molding step may include: a first injection molding block disposition step of arranging a first injection molding block that forms at least a part of the unit stopper corresponding extension (513) and the unit stopper corresponding contact connection (515); a second injection molding block disposition step of arranging a second injection molding block that at least forms the unit stopper corresponding contact (511); and a third injection molding block disposition step of arranging a third injection molding block at a position where the unit stopper corresponding contact (511) is formed so as to at least partially abut against the first injection molding block and the second injection molding block.

In the method of manufacturing a push switch unit for a vehicle, in the second injection molding step, the third injection molding block may be disposed at a partitioning position to define a space of the unit stopper corresponding contact (511).

In still another aspect, the present invention provides a method of manufacturing a push switch unit, the push switch unit including: a unit housing (100); a unit switch section (300) including a unit switch moving block (320) movably mounted in the unit housing (100), and a unit switch (310) for changing a switching operation signal in response to the movement of the unit switch moving block (320); and a unit stopper section (500) provided at the unit switch moving block (320) and the unit housing (100), wherein the unit stopper section (500) is at least partially injection-molded.

Advantageous Effects

The push switch unit for a vehicle according to the present invention as constructed above has the following advantageous effects.

First, the push switch unit for a vehicle according to the present invention can prevent or minimize unnecessary noise/vibration/ununiform operation through a structure implemented in an integral manufacturing process integrated with a damping function element through a double-shot injection-molded structure, thereby improving assembly convenience and operation durability.

Second, the push switch unit for a vehicle according to the present invention can minimize the number of constituent elements, enhance a degree of design freedom, and improve assemblability, thereby achieving a reduction in the manufacturing cost due to productivity improvement.

Third, the push switch unit for a vehicle according to the present invention can enable various arrangement configurations depending on design specifications through a configuration in which the unit stopper corresponding part-mounting part or the unit stopper corresponding part that is injection-molded thereinto is at least partially intersected, parallel and/or intersected and parallel with the moving direction of the unit switch moving block.

Fourth, the push switch unit for a vehicle recording to the present invention can enable various arrangement configurations depending on design specifications through a configuration in which the unit stopper corresponding part-mounting part or the unit stopper corresponding part that is injection-molded thereinto has a '⊏'-shaped structure with respect to the moving direction of the unit switch moving block, and/or the unit stopper corresponding part-mounting part or the unit stopper corresponding part that is injection-molded thereinto is adjusted in the vertical length of the upper and lower portions thereof, and manipulation sensitivity can be enhanced by preventing unwanted separation and eliminating the occurrence of a rattling noise.

Although a description has been made focusing on the case where the push switch of the present invention is arranged in a window switch unit of a vehicle, it will be apparent to those skilled in the art that the push switch unit for a vehicle according to the present invention may be applied to implementation of various switching functions in a vehicle or a device other than the vehicle within the scope of implementing a push operation.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Figure 1:
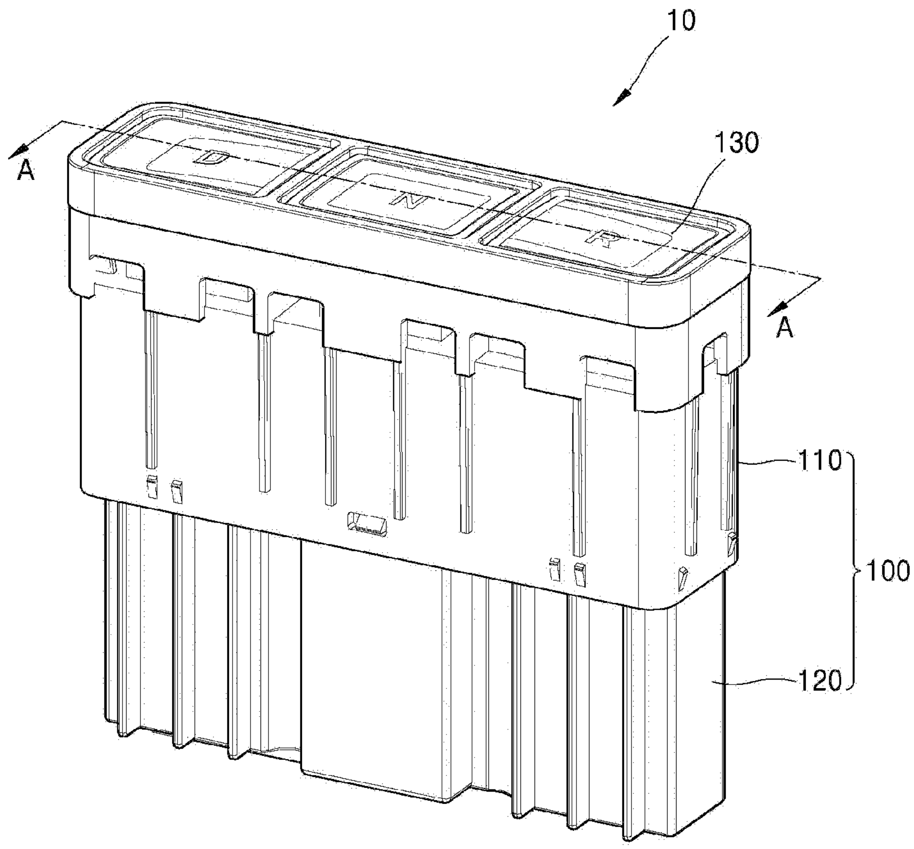
FIG. 1 is a schematic perspective view illustrating a push switch unit for a vehicle according to an embodiment of the present invention.
Figure 2:
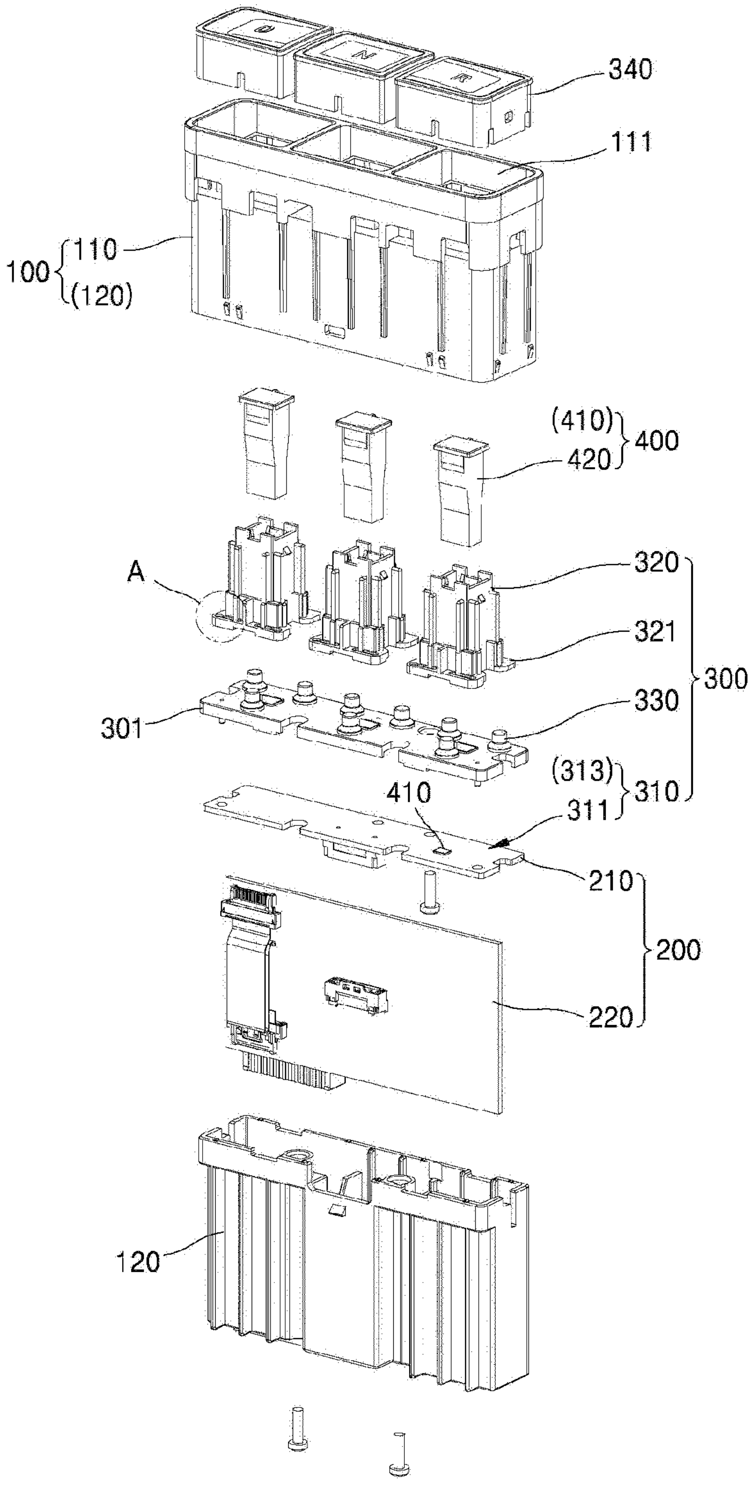
FIG. 2 is a schematic exploded perspective view illustrating a push switch unit for a vehicle according to an embodiment of the present invention.
Figure 3:
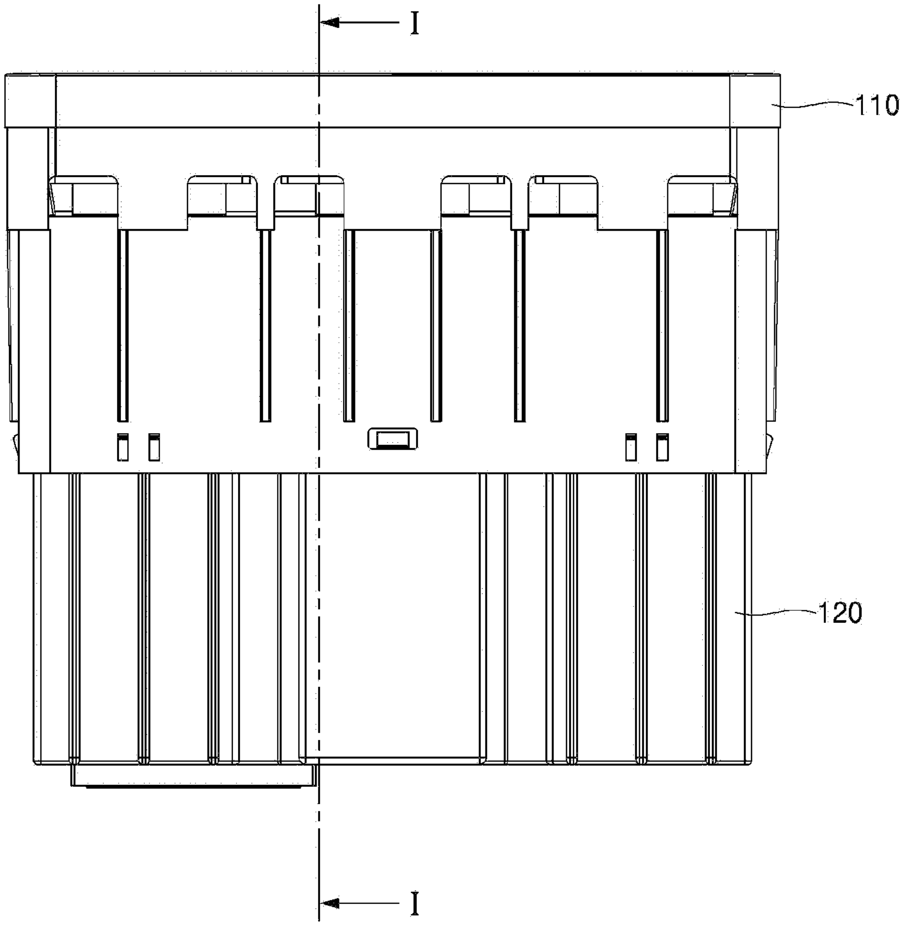
FIG. 3 is a schematic front view illustrating a push switch unit for a vehicle according to an embodiment of the present invention.
Figure 4:
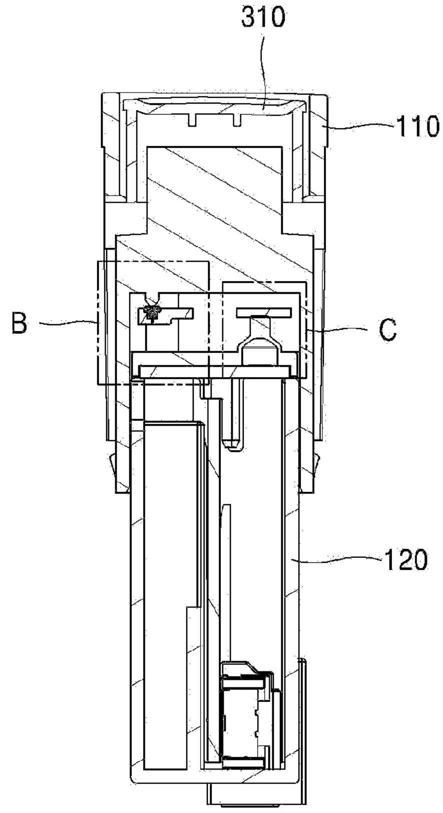
FIG. 4 is a vertical cross-sectional view taken along the line I-I of FIG. 3 illustrating a push switch unit for a vehicle according to an embodiment of the present invention.

Now, preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

A push switch unit 10 for a vehicle according to the present invention is implemented as a switch device, particularly as a switch for operating various output power elements of a vehicle in a specific embodiment of the present invention. Although a description will be made focusing on the case where the push switch unit 10 for a vehicle in this embodiment is implemented as a switch device for selecting a gear shift operation of a transmission of the vehicle, the present invention is not limited thereto, and may be variously used as an element for performing various switching operations of a device, particularly a vehicle.

The push switch unit 10 for a vehicle of the present invention includes a unit housing 100 and a unit switch section 300. The push switch unit 10 for a vehicle of the present invention further includes a unit stopper section 500.

The unit housing 100 is mounted in the vehicle. The unit housing 100 includes a unit housing body 110 and a unit housing base 120. The unit housing body 110 and the unit housing base 120 are engaged with each other by a unit housing fastening part 101 to define an inner space therebetween to allow other constituent elements to be accommodated therein.

The unit housing body 110 includes a unit housing body opening 111 formed at one end thereof to form a through-space to allow other constituent elements to disposed therein, and The unit housing body 110 has a unit housing body opening 111 disposed at one end thereof to form a through space in which other components are disposed, and a unit switch knob 340 which will be described later is disposed at the unit housing body opening 111 to enable implementation of a predetermined switching operation.

The unit housing base 120 engaged with the unit housing body 110 is fixedly mounted to other constituent elements of the vehicle, and a unit substrate 200 is disposed in the internal space defined between the unit housing body 110 and the unit housing base 120.

In this embodiment, the unit substrate 200 includes a unit horizontal substrate 210 and a unit vertical substrate 220. The unit horizontal substrate 210 is disposed in the internal space defined between the unit housing body 110 and the unit housing base 120 in a direction perpendicular to a moving direction of a unit switch moving block 320 which will be described later. In this embodiment, a unit vertical substrate connector 221 is disposed on the unit vertical substrate 220. The unit vertical substrate connector 221 is connected to an external electrical device, for example, a control unit (not shown) to achieve transmission of a predetermined electrical signal.

The unit vertical substrate 220 is disposed perpendicular to the unit horizontal substrate 210. The unit vertical substrate 220 includes a unit horizontal substrate connector 223 to allow an electrical connection to be established between the unit vertical substrate 220 and the unit horizontal substrate 210 through the unit horizontal substrate connector 223. In this embodiment, at least one of the unit housing body 110 and the unit housing base 120 may have a configuration in which it includes a flexible substrate. In addition, the arrangement configuration of the unit housing body 110 and the unit housing base 120 in this embodiment may be modified in various manners depending on design specifications as an example of this embodiment.

The unit switch section 300 is movably mounted in the unit housing 100. The unit switch section 300 is at least partially disposed in the internal defined between the unit housing body 110 and the unit housing base 120 of the unit housing 100.

The unit switch section 300 includes a unit switch moving block 320 and a unit switch 310. The unit switch unit 300 according to an embodiment of the present invention includes the unit switch knob 340. The unit switch knob 340 has a structure in which it is disposed at one end of the unit switch moving block 320.

The unit switch moving block 320 is movably mounted in the internal defined between the unit housing body 110 and the unit housing base 120 of the unit housing 100. The unit switch moving block 320 is implemented as a cavity-shaped block type having a length in a direction in which it is moved under pressure.

The unit switch knob 340 is disposed at one end of the unit switch moving block 320. The unit switch knob 340 has a structure in which it is positionally fixedly fastened to the open end of the unit switch moving block 320. The unit switch knob 340 has a structure in which it is operated in a pressing direction at a predetermined interval in this embodiment.

A predetermined icon is displayed on one surface of the unit switch knob 340. The icon may be formed by a method such as laser etching or the like, and may be applied in various manners.

The unit switch moving block 320 includes a unit switch moving block body 325 and a unit switch moving block base 321. The unit switch moving block body 325 is movably disposed within the unit switch section 300), and allows the unit switch knob 340 to be mounted at one end thereof. The unit switch moving block base 321 is disposed at the other end of the unit switch moving block body 325 to move the unit switch 310.

More specifically, the push switch unit 10 for a vehicle includes a unit light source unit 400. The unit light source unit 400 is at least partially disposed in an internal space formed by the unit switch moving block body 325. The unit light source unit 400 is disposed within the unit housing 100 to emit light to the outside.

The unit light source section 400 includes a unit light source 410 and a unit light source transmission part 420. The unit light source 410 is positionally fixed to the unit substrate 200 disposed within the unit housing 100, more specifically, to the unit horizontal substrate 210 to generate and emit light in response to an input signal applied thereto.

A unit rubber pad 301 which will be described later may be disposed on one surface of the unit horizontal substrate 210 of the unit substrate 200. The unit rubber pad 310 includes a predetermined through-hole formed thereon so that light generated from the unit light source 410 disposed on one surface of the unit horizontal substrate 210 can be transmitted through the through-hole.

Light generated from the unit light source 410 of the unit light source section 400 is transmitted to the unit light source transmission unit 420. The unit light source transmission unit 420 is disposed toward the unit light source 410 at one end thereof and toward the unit switch knob 340 at the other end thereof.

More specifically, a knob display part 341 is disposed on the unit knob 340. The other end of the unit light source transmission part 420 is disposed toward the knob display part 341 disposed on one surface of the unit switch knob 340 so that light emitted from the unit light source transmission part 420 is inputted to the unit light source transmission unit 420 through one end of the unit light source transmission part 420 and then exits externally through the other end of the unit light source transmission part 420 and then the knob display part 341 to enable visual recognition of a user, particularly a driver In this embodiment, the unit light source section has a configuration in which it includes an LED-type unit light source, but various modifications thereof may be made depending on design specifications, such as having a structure in which in some embodiments, a flexible display such as OLED is disposed on the rear side of the unit switch knob in the form of a surface light source, or a structure in which in this case, a separate configuration of the unit light source transmission part is excluded.

Meanwhile, the unit switch moving block base 321 is connected to the unit switch moving block body 325. The unit switch moving block base 321 is disposed at the other end of the unit switch moving block body 325. In this embodiment, the unit switch moving block base 321 has an outer edge larger than that of the unit switch moving block body 325 and is brought into direct contact with the unit switch moving block body 325 of the unit switch section 300 so that when the unit switch moving block body 325 is moved, the unit switch moving block base 321 is moved together with the unit switch moving block body 325 to change a switching signal of the unit switch 310.

The unit switch section 300 includes the unit switch 310. The unit switch 310 is brought into contact with the unit switch moving block base 321 disposed at the lower end of the unit switch moving block 320 in response to the movement of the unit switch moving block 320 to cause a change in position to change a switching operation signal.

The unit switch 310 includes a unit switch fixed part 311 and a unit switch movable part 313. The unit switch fixed part 311 is disposed on the unit substrate 200 disposed within the unit housing 100. The unit switch movable part 313 is moved to a position corresponding to the unit switch fixed part 311 by the unit switch moving block 320 to allow for control of a contact between the unit switch movable part 313 and the unit switch fixing part 311.

In this embodiment, the unit substrate 200 allows a unit rubber pad 301 to be disposed on surface thereof. The unit switch 310 includes a unit switch rubber movable part 330 disposed on the unit rubber pad 301. The unit switch rubber movable part 330 includes a unit switch movable contact 331, a unit switch movable support 333, and a unit switch movable connection 332.

The unit switch movable contact 331 is contactable with the unit switch moving block base 321. The unit switch movable support 333 is disposed on the unit rubber pad 301. The unit switch movable connection 332 is contactingly connected at one end thereof to the unit switch movable contact 331 and at the other end thereof to the unit switch movable support 333.

In this case, the unit switch movable part 313 is disposed at an inner bottom end of the unit switch movable contact 331 with the unit switch movable part 313 facing the unit switch fixed part 311 so that when the unit switch moving block base 321 is moved to press the unit switch movable contact part 311, the unit switch movable part 313 causes a change in a contact state with the unit switch fixed part 311 to induce a change in a predetermined switching operation signal.

In this embodiment, the unit switch 310 is implemented as a rubber pad type push switch, and various modifications thereof may be made, such as being implemented as a tact switch having a unit structure in some embodiments.

In the meantime, the push switch unit 10 for a vehicle of the present invention includes the unit stopper section 500. The unit stopper section 500 may prevent the occurrence of a noise due to collision between constituent elements or a rattling noise due to fine vibration during return after a push operation of the unit switch moving block 320 due to the pressing of the unit switch knob 340 of the vehicle push switch unit 10 of the present invention.

In other words, the push switch unit 10 for a vehicle of the present invention includes the unit stopper section 500 provided at the unit switch moving block 320 and the unit housing 100. The unit stopper section 500 has a structure in which it is at least partially injection-molded without being inserted under pressure.

More specifically, the unit stopper section 500 includes a unit stopper 520 and a unit stopper corresponding part 510. The unit stopper 520 is disposed within the unit housing 100, and the stopper corresponding part 510 is disposed at the unit switch moving block 320 so as to correspond to a position of the unit stopper 520.

The unit stopper 520 is implemented to have a predetermined wedge-shaped end in this embodiment. When the unit stopper and the unit stopper corresponding part are provided in plural numbers, the unit stopper 520 may be variously modified in shape within the scope of preventing or minimizing unnecessary imbalance due to a step.

Figure 6:
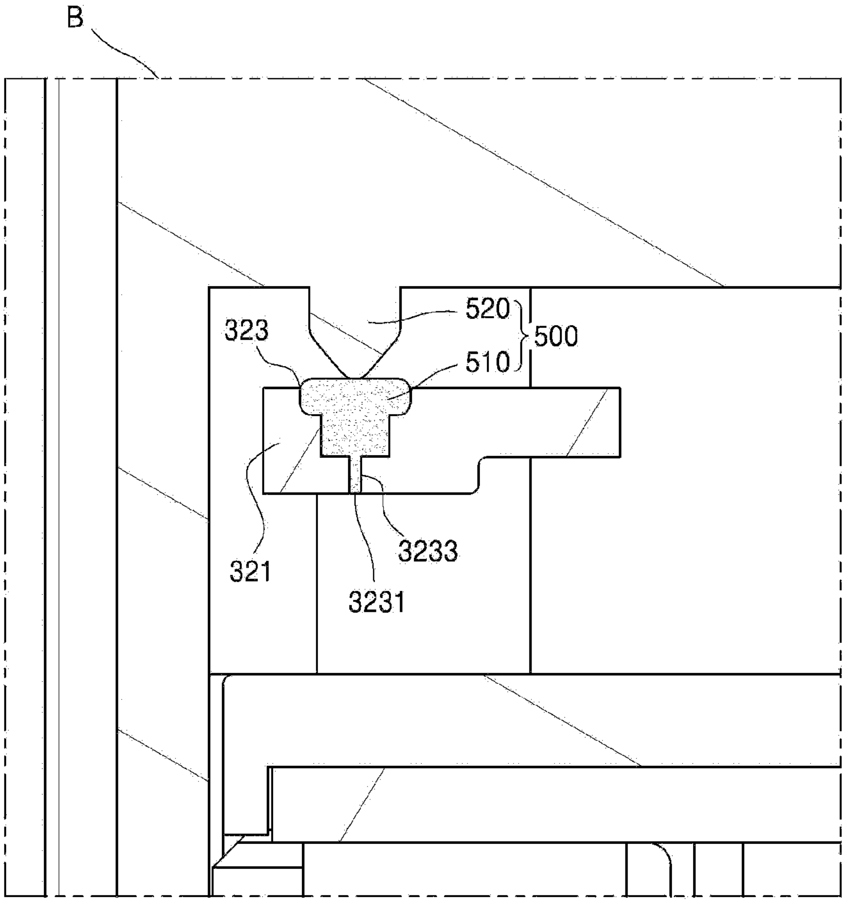
FIG. 6 is a partially enlarged cross-sectional view of a portion B of FIG. 4 illustrating a push switch unit for a vehicle according to an embodiment of the present invention.

Meanwhile, the unit stopper corresponding part 510 of the present invention forms an injection-molded structure, but not a conventional fitting structure for damping the contact between constituent elements. In other words, the unit stopper corresponding part 510 is injection-formed. As shown in FIG. 6, the unit stopper 520 according to an embodiment of the present invention is disposed toward the inner bottom surface of the unit housing body 110 of the unit housing 100, and the unit stopper corresponding part 510 is disposed at the unit switch moving block base 321 so as to opposite to the unit block 310.

The unit stopper corresponding part-mounting part 323 according to an embodiment of the present invention is formed in the unit switch moving block base 321, and the unit stopper corresponding part 510 is disposed in the unit stopper corresponding part-mounting part 323.

The unit stopper corresponding part-mounting part 323 includes a unit stopper corresponding part-mounting injection part 3231, a unit stopper corresponding part-mounting extension part 3233, a unit stopper corresponding part-mounting extension connection part 3235, a unit stopper corresponding part-mounting confrontation connection part 3237, and a unit stopper corresponding part-mounting confrontation part 3239.

The unit stopper corresponding part-mounting injection part 3231 has an injection structure in which it is formed on a surface opposite to a surface of the unit stopper corresponding part-mounting part 323, which faces the unit stopper 520, that is, on a bottom surface of the unit stopper corresponding part-mounting part 323 (see FIG. 7) in this embodiment to inject an injection molding material for forming the unit stopper corresponding part 510. The unit stopper corresponding part-mounting extension part 3233 is connected to the unit stopper corresponding part-mounting injection part 3231 to form at least a part of an element for preventing separation of the unit stopper corresponding part 510 through an injection molding material disposed therein.

The unit stopper corresponding part-mounting confrontation part 3239 (see FIG. 7) forms a structure in which the unit stopper corresponding part 510 is exposed outwardly, and the unit stopper 520 is exposedly disposed at the unit stopper mounting confrontation part 3239.

The unit stopper corresponding part-mounting connecting part (3235 and 3237) is disposed between the unit stopper corresponding part-mounting extension part 3233 and the unit stopper corresponding part-mounting confrontation part 3239. The unit stopper corresponding part-mounting connecting part (3235 and 3237) includes the unit stopper corresponding part-mounting extension connection part 3235 and the unit stopper corresponding part-mounting confrontation connection part 3237. The unit stopper corresponding part-mounting extension connection part 3235 extends from one end thereof connected to the unit stopper corresponding part-mounting extension part 3233 and to the other end thereof connected to the unit stopper corresponding part-mounting confrontation part 3239. The unit stopper corresponding part-mounting confrontation connection part 3237 extends from one end thereof connected to the unit stopper corresponding part-mounting extension part 3233 and to the other end thereof connected to the unit stopper corresponding part-mounting extension part 3233.

The unit stopper corresponding part 510 disposed in a space formed by at least the unit stopper corresponding part-mounting extension part 3233 may have an intersection structure or a non-overlapping structure depending on an arrangement structure.

In other words, in the case where the unit stopper corresponding part 510 disposed in the space formed by at least the unit stopper corresponding part-mounting extension part 3233 has the intersection structure, the unit switch moving block base 321 includes the unit stopper corresponding part-mounting part 323 formed therein, and the unit stopper corresponding part 510 is disposed in the unit stopper corresponding part-mounting part 323.

Figure 7:
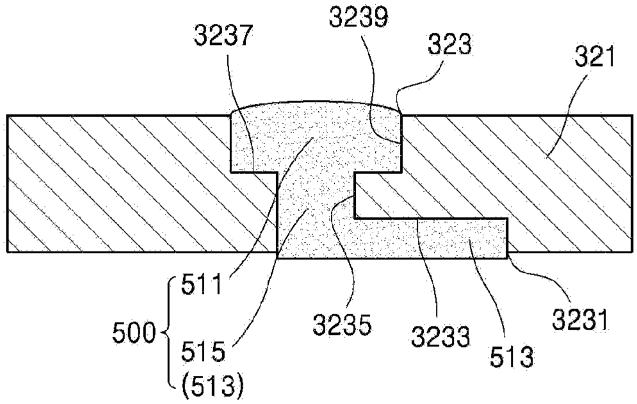
FIGS. 7 to 9 illustrate various modifications of a unit stopper corresponding part-mounting part of a push switch unit for a vehicle according to an embodiment of the present invention.
Figure 8:
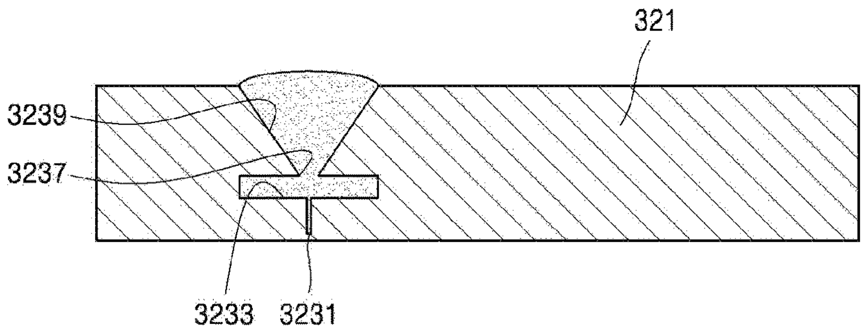

In this case, the unit stopper corresponding part-mounting part 323 at least partially includes the unit stopper corresponding part mounting extension part 3233, and a space formed thereby is partitioned. The unit stopper corresponding part-mounting extension part 3233 has a length in a direction intersecting the moving direction of the unit switch moving block 320. In other words, as shown in FIGS. 7 and 8, the unit stopper corresponding part-mounting extension part 3233 is formed extending in a direction perpendicular to the relative movement direction between the unit stopper and the unit stopper corresponding part. An injection molding material is accommodated in a space formed by the unit stopper corresponding part-mounting extension part 3233, and the unit stopper corresponding part 510 received in the space is prevented from being separated externally from the unit stopper corresponding part-mounting part 323 through resistance against at least a part of the unit stopper corresponding part-mounting part 323, i.e., at least a part of the unit stopper corresponding part-mounting extension part 3233, the unit stopper corresponding part-mounting extension connection part 3235, and the unit stopper corresponding part-mounting confrontation connection part 3237.

The unit stopper corresponding part 510 disposed in the unit stopper corresponding part-mounting part 323 having the above-described structure has a structure in which it is prevented from unwantedly separated from the unit stopper corresponding part-mounting part 323.

Figure 16:
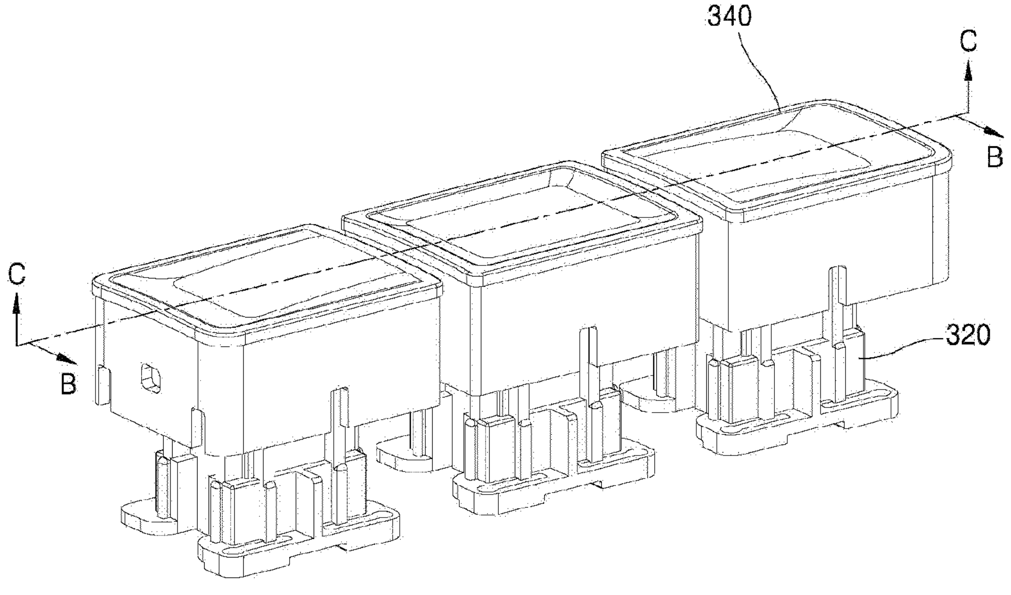
FIG. 16 is schematic partial perspective view illustrating a unit switch section of a push switch unit for a vehicle according to an embodiment of the present invention.
Figure 17:
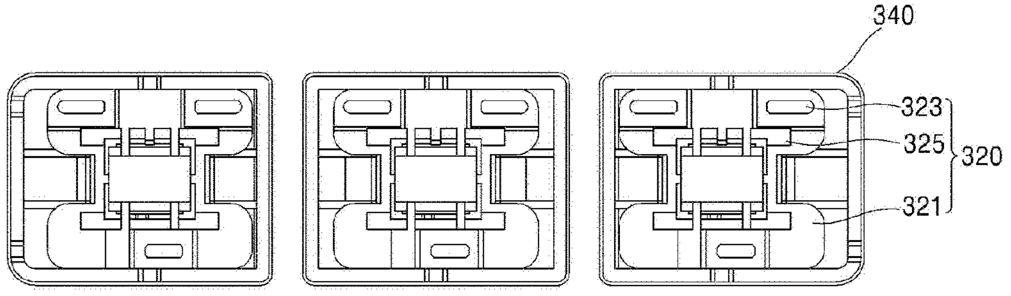
FIG. 17 is a horizontal cross-sectional view taken along the line C-C of FIG. 16.
Figure 18:
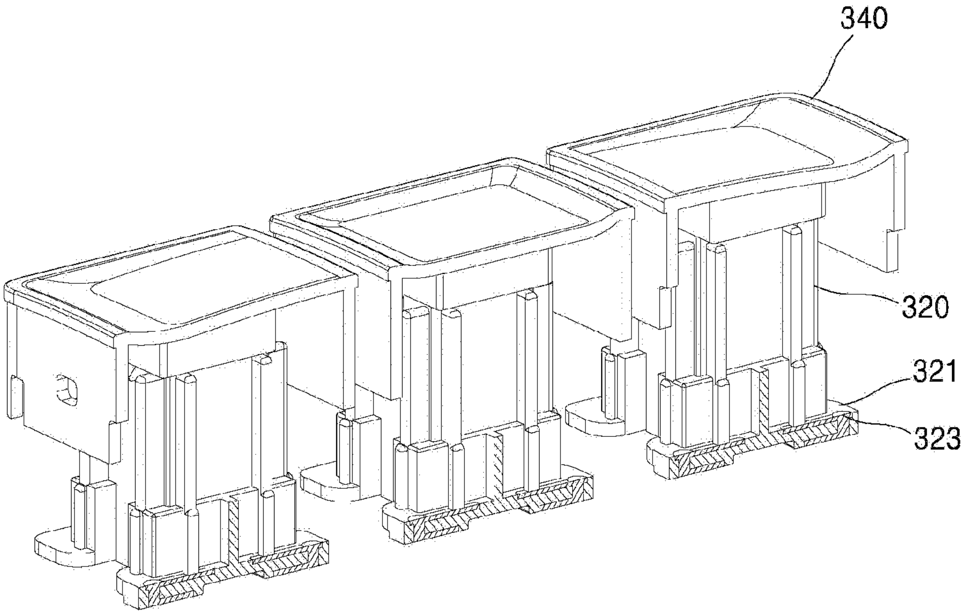
FIGS. 18 and 20 are top perspective and side cross-sectional views taken along the line B-B of FIG. 16.
Figure 19:
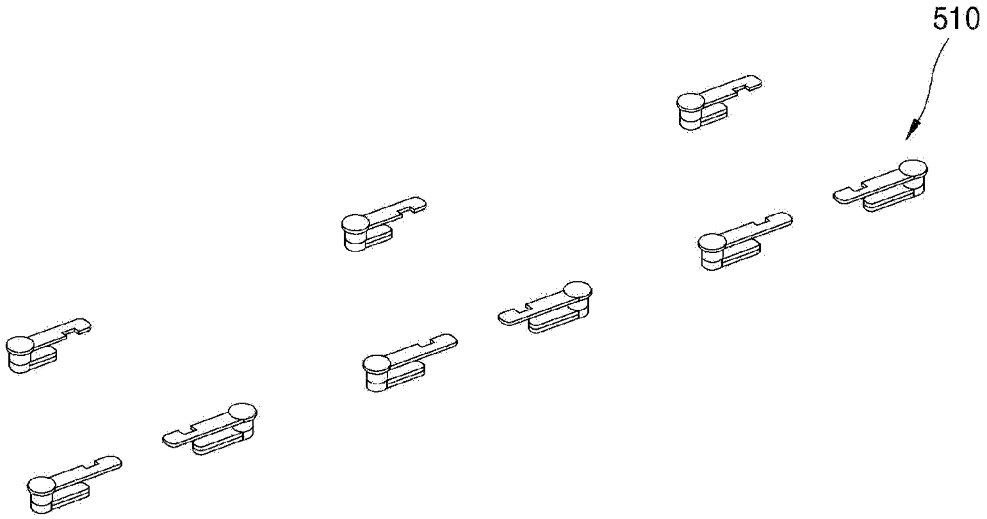
FIG. 19 is a top perspective view illustrating a unit stopper corresponding part of a push switch unit for a vehicle according to an embodiment of the present invention.
Figure 20:
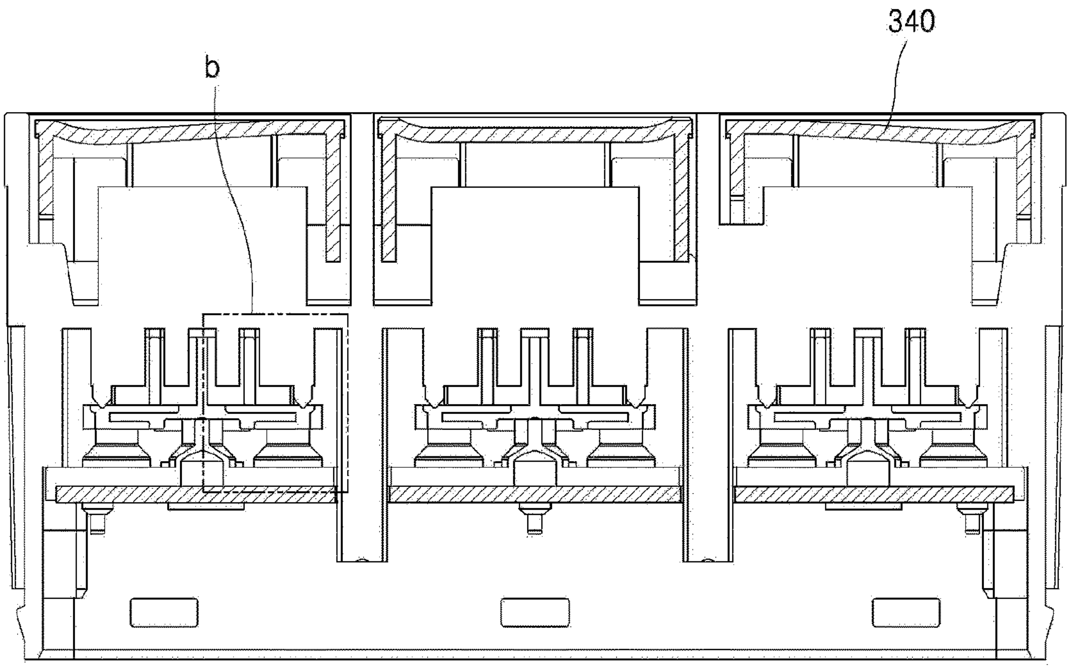
Figure 21:
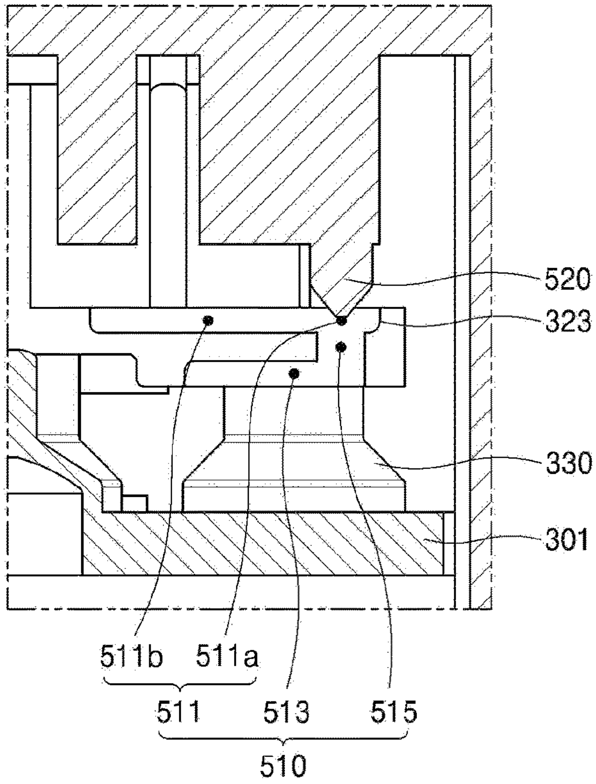
FIG. 21 is a partially enlarged cross-sectional view of FIG. 20.
Figure 22:
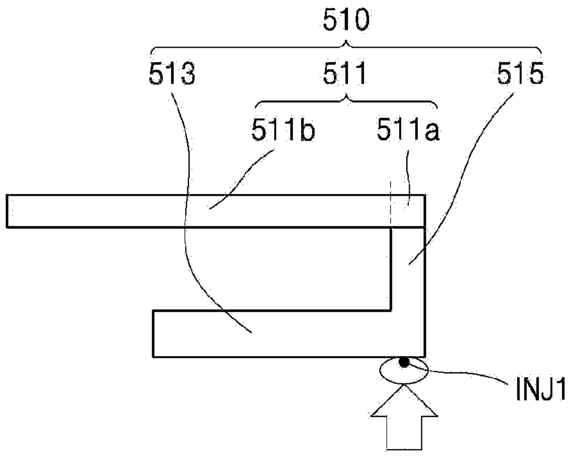
FIG. 22 to FIG. 24 are schematic diagrammatic views illustrating material injection points for injection molding a unit stopper corresponding part of a push switch unit for a vehicle according to an embodiment of the present invention.
Figure 23:
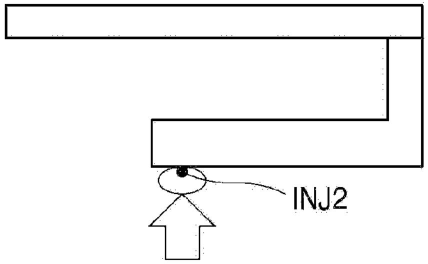
Figure 24:
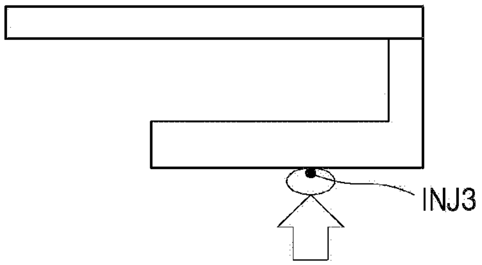
Figure 25:
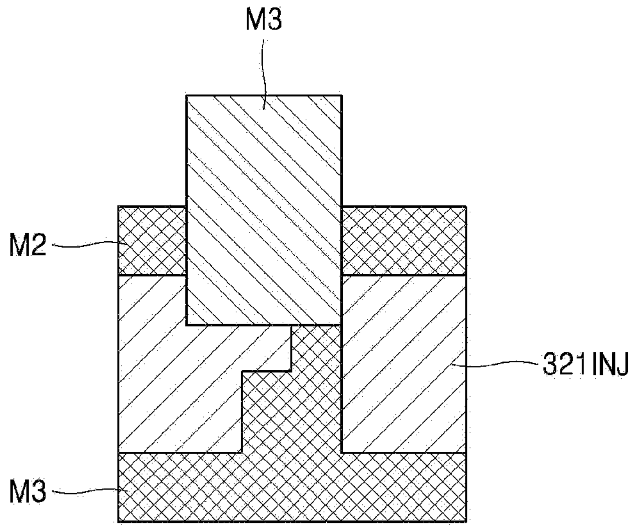
FIGS. 25 and 26 are process diagrams illustrating a process of injection molding a unit stopper corresponding part of a push switch unit for a vehicle according to an embodiment of the present invention.
Figure 26:
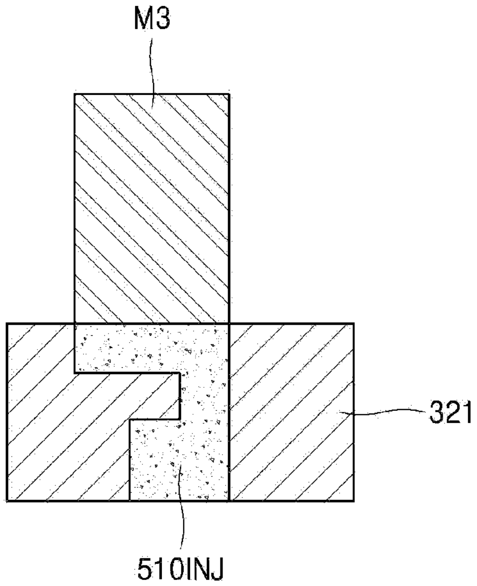
Figure 27:
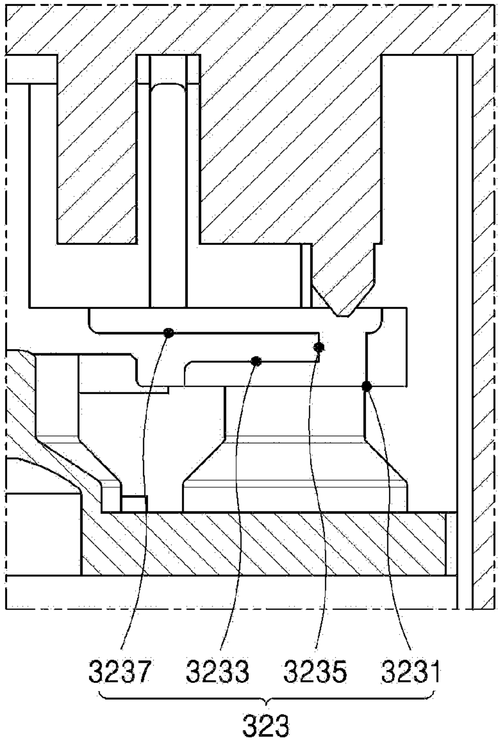
FIG. 27 is a cross-sectional view illustrating a unit stopper corresponding part-mounting part formed at a lower end of a unit switch moving block so as to injection-mold a unit stopper corresponding part of a push switch unit for a vehicle according to an embodiment of the present invention.
Figure 28:
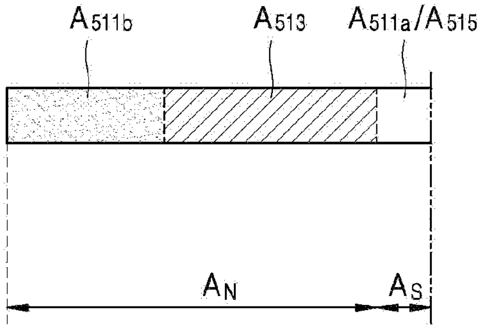
FIG. 28 is a projection diagram illustrating a state in which a unit stopper corresponding part-mounting part of FIG. 22 is protected onto a plane perpendicular to the moving direction of a unit switch moving block.

In addition, the unit stopper corresponding part 510 disposed in the unit stopper corresponding part-mounting part 323 has a structure in which it is prevented from separated from the unit stopper corresponding part-mounting part 323 through the interaction with the unit stopper corresponding part-mounting part 323. FIGS. 16 to 26 are diagrammatic views illustrating an arrangement state or a manufacturing process of the unit stopper corresponding part 510 disposed in the unit stopper corresponding part-mounting part 323. FIG. 16 is schematic partial perspective view illustrating the unit switch section 300 of the push switch unit 10 for a vehicle according to an embodiment of the present invention. The unit switch moving block 320 is disposed under the unit switch knob 340. FIG. 17 is a horizontal cross-sectional view taken along the line C-C of FIG. 16, FIGS. 18 and 20 are top perspective and side cross-sectional views taken along the line B-B of FIG. 16, FIG. 19 is a top perspective view illustrating the unit stopper corresponding part 510, FIG. 21 is a partially enlarged cross-sectional view of a portion b of FIG. 20, FIG. 22 to FIG. 24 are schematic diagrammatic views illustrating material injection points for injection molding the unit stopper corresponding part 510, FIGS. 25 and 26 are process diagrams illustrating a process of injection molding the unit stopper corresponding part 510, and FIG. 27 is a cross-sectional view illustrating the unit stopper corresponding part-mounting part 323 formed at a lower end of the unit switch moving block 320 so as to injection-mold the unit stopper corresponding part 510.

In other words, in this embodiment, the unit stopper corresponding part 510 includes a unit stopper corresponding contact 511, a unit stopper corresponding extension 513, and a unit stopper corresponding contact connection 515.

The unit stopper corresponding contact 511 is contactable with the unit stopper 520. The unit stopper corresponding extension 513 is disposed at a side opposite to the unit stopper corresponding contact 511, and has a structure in which it has a projection region different from that of the unit stopper corresponding contact 511 when projected onto a plane perpendicular to the moving direction of the unit switch moving block 320 so that the unit stopper corresponding extension 513 can be prevented from being separated from the unit stopper corresponding part-mounting part 323 by hindering contact with the inner side of the unit stopper corresponding part-mounting part 323. The unit stopper corresponding contact connection 515 interconnects the unit stopper corresponding contact 511 and the unit stopper corresponding extension 513. The unit stopper corresponding contact 511 also has a structure in which it has a projection region different from that of the unit stopper corresponding contact connection 515 when projected onto a plane perpendicular to the moving direction of the unit switch moving block 320, so that a structure of preventing the unit stopper responding contact 511 or the unit stopper responding extension 513 from being separated from the unit stopper corresponding part-mounting part 323 may also be implemented at the upper end side of the drawing sheet. In other words, the unit stopper corresponding contact 511 (see FIG. 22) includes a first unit stopper corresponding contact 511*b* and a second unit stopper corresponding contact 511*a*. The unit stopper corresponding contact 511 has a structure in which when the second unit stopper corresponding contact 511*a* is projected onto a plane perpendicular to the moving direction of the unit switch moving block 320, a projection region $A_{511a}/A_{515}$ of the second unit stopper corresponding contact 511$a$ is overlapped with the projection region $A_{511a}/A_{515}$ of the unit stopper corresponding contact connection 515 whereas a projection region $A_{511b}$ of first the unit stopper corresponding contact 511$b$ is non-overlapped with the projection region $A_{511a}/A_{515}$ of the unit stopper corresponding contact connection 515. The unit stopper corresponding extension 513 has a structure in which when the unit stopper corresponding extension 513 is projected onto a plane perpendicular to the moving direction of the unit switch moving block 320, a projection region $A_{513}$ of the unit stopper corresponding extension 513 is non-overlapped with the projection region $A_{511a}/A_{515}$ of the unit stopper corresponding contact connection 515. Thus, by virtue of a configuration in which a non-overlapped region denoted by reference symbol $A_N$ and an overlapped region denoted by reference symbol As are arranged, the unit stopper corresponding part 510 can be prevented from being unwantedly separated from the unit stopper corresponding part-mounting part 323.

In addition, in this embodiment, the arrangement structure of the unit stopper corresponding contact 511, the unit stopper corresponding extension 513, and the unit stopper corresponding contact connection 515 may have a '⊏'-shape. In this embodiment, as shown in FIG. 21, the unit stopper corresponding contact 511 has a structure in which it has a length larger than that of the unit stopper corresponding extension 513. The unit stopper corresponding contact 511 and the unit stopper corresponding extension 513 may be variously modified in length depending on design specifications, such as having a structure in which the unit stopper corresponding extension 513 has a length larger than that of the unit stopper corresponding contact 511 as shown in FIG. 7.

When the unit stopper corresponding contact 511 and the unit stopper corresponding extension 513 are projected onto a plane perpendicular to the moving direction of the unit switch moving block 320, the overlapped region of the unit stopper corresponding contact 511 and the unit stopper corresponding extension 513 may be the same or different depending on the length. The unit stopper corresponding contact 511 and the unit stopper corresponding extension 513 may have a projection region different from that of the unit stopper corresponding contact connection 515.

The manufacture of the unit stopper corresponding part 510 including the unit stopper corresponding contact 511, the unit stopper corresponding extension 513, and the unit stopper corresponding contact connection 515 may be performed through a stepwise injection molding process, i.e., a double-shot injection molding process consisting of a primary injection molding step of forming the unit stopper corresponding part-mounting part 323 and a secondary injection molding step of injecting the unit stopper corresponding part 510 into the unit stopper corresponding part-mounting part 323. The unit stopper corresponding part 510 may form a separation prevention structure using different widths through the double-shot injection molding process and an elastic contact structure in which it is elastically brought into contact with the unit stopper 520.

In other words, as shown in FIG. 25, a primary injection molding material 321INJ may be injected into an injection space defined by injection molding blocks M1 and M2 and an upper M3, i.e., a first injection molding block M1, a second injection molding block M2, and a third injection molding block M3, to form the unit switch moving block base 321 of the unit switch moving block 320, which allows the unit stopper corresponding part-mounting part 323 to be formed therein. As shown in FIG. 27, the unit stopper corresponding part-mounting part 323 includes a unit stopper corresponding part-mounting injection part 3231, a unit stopper corresponding part-mounting extension part 3233, a unit stopper corresponding part-mounting extension connection part 3235, a unit stopper corresponding part-mounting confrontation connection part 3237, and a unit stopper corresponding part-mounting confrontation part 3239, which is the same as previously described.

The secondary injection molding material made of a rubber material is injected into the thus formed unit stopper corresponding part-mounting part 323 through the unit stopper corresponding part-mounting injection part 3231 disposed at a bottom of the unit stopper corresponding part-mounting part 321. The secondary injection molding material 510INJ injected into the unit stopper corresponding part-mounting part 321 that has been primarily injection-molded is prevented from being injected by the upper injection block M3 to thereby form the unit stopper corresponding part 510.

In the secondary injection molding step, the secondary injection molding material 510INJ is injected into the unit stopper corresponding part-mounting part 323 through the unit stopper corresponding part-mounting injection part 3231. An injection point of the unit stopper corresponding part-mounting injection part 3231 may be selected in various manners depending on design specifications, such as INJ1, INJ2, and INJ3 shown in FIGS. 22 to 24.

More specifically, according to an embodiment of the present invention, in a method of manufacturing a push switch unit for a vehicle, including: a unit housing 100; a unit switch section 300 including a unit switch moving block 320 movably mounted in the unit housing 100, and a unit switch 310 for changing a switching operation signal in response to the movement of the unit switch moving block 320; and a unit stopper section 500 provided at the unit switch moving block 320 and the unit housing 100, wherein the unit stopper section 500 is at least partially injection-molded. As described above, the unit stopper section 500 includes: a unit stopper 520 disposed within the unit housing 100; and a unit stopper corresponding part 510 disposed at the unit switch moving block 320 so as to correspond to a position of the unit stopper 520, and the unit stopper corresponding part 510 may be injection-molded.

In this case, as shown in FIGS. 25 and 26, the method of manufacturing a push switch unit 10 for a vehicle may include a first injection molding step of forming the unit stopper corresponding part-mounting part 323 in the unit switch moving block base 321 of the unit switch moving block 320, and a second injection molding step of injecting a material for forming the unit stopper corresponding part 510 into the unit stopper corresponding part-mounting part 323

The unit stopper corresponding part 510 formed through the first injection molding step and the second injection molding step includes: a unit stopper corresponding contact 511 configured to be contactable with the unit stopper 520; a unit stopper corresponding extension 513 disposed at a side opposite to the unit stopper corresponding contact 511, and having a projection region different from that of the unit stopper corresponding contact 511 when projected onto a plane perpendicular to the moving direction of the unit switch moving block 320; and a unit stopper corresponding contact connection 515 configured to interconnect the unit stopper corresponding contact 511 and the unit stopper corresponding extension 513. In FIG. 25, the first injection molding step includes a first injection molding block disposition step, a second injection molding block disposition step, and a third injection molding block disposition step. In other words, in the first injection molding block disposition step, the first injection molding block M1 is disposed which forms at least a part of the unit stopper corresponding extension 513 and the unit stopper corresponding contact connection 515. In the second injection molding block disposition step, the second injection molding block M2 is disposed which at least forms the unit stopper corresponding contact 511. In the third injection molding block disposition step, the third injection molding block M3 is disposed at a position where the unit stopper corresponding contact 511 is formed so as to at least partially abut against the first injection molding block and the second injection molding block. After the injection molding blocks have been disposed, the unit stopper corresponding part-mounting part 323 is formed in the unit switch moving block base 321 of the unit switch moving block through injection of the material.

Thereafter, the second injection molding step is performed. In the second injection molding step, the third injection molding block may be disposed at a partitioning position to define a space of the unit stopper corresponding contact 511. In this case, In this case, the double-shot injection molding of the unit stopper corresponding part 510 may be performed through injection of a rubber material. Here, the partitioning position is a position for partitioning the unit stopper corresponding contact 511 and refers to a boundary region that does not permit invasion into the unit stopper corresponding contact part 511.

Although the push switch unit for a vehicle and the method of manufacturing the same have been described in this embodiment, the present invention is not limited thereto and may be applied to switches other than vehicles. In other words, the present invention may provide a method of manufacturing a push switch unit, including: a unit housing 100; a unit switch section 300 including a unit switch moving block 320 movably mounted in the unit housing 100, and a unit switch 310 for changing a switching operation signal in response to the movement of the unit switch moving block 320; and a unit stopper section 500 provided at the unit switch moving block 320 and the unit housing 100, wherein the unit stopper section 500 is at least partially injection-molded.

The unit stopper corresponding part 510 may form a separation prevention structure using different widths through the double-shot injection molding process consisting of a primary injection molding step of forming the unit stopper corresponding part-mounting part 323 and a secondary injection molding step of injecting the unit stopper corresponding part 510 into the unit stopper corresponding part-mounting part 323 and an elastic contact structure in which it is elastically brought into contact with the unit stopper 520.

Figure 9:
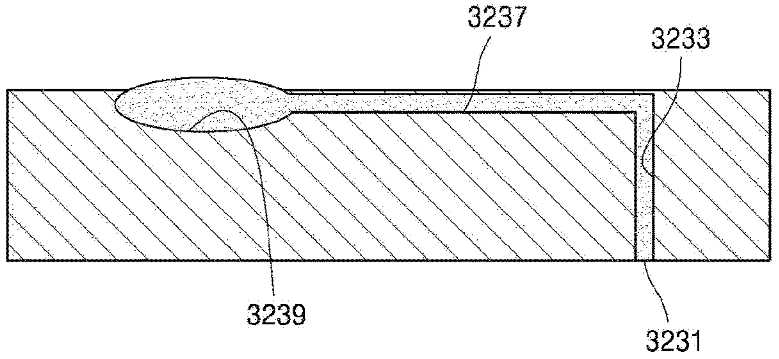
Figure 10:
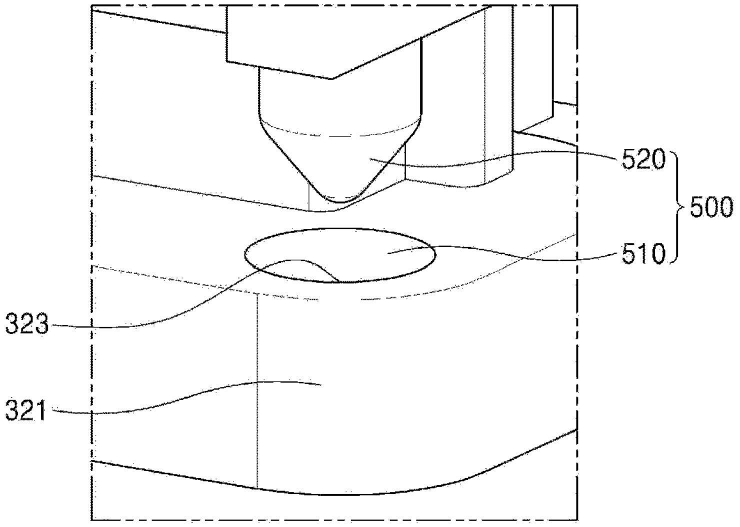
FIG. 10 is a schematic partial perspective view illustrating a unit stopper section of a push switch unit for a vehicle according to an embodiment of the present invention.
Figure 11:
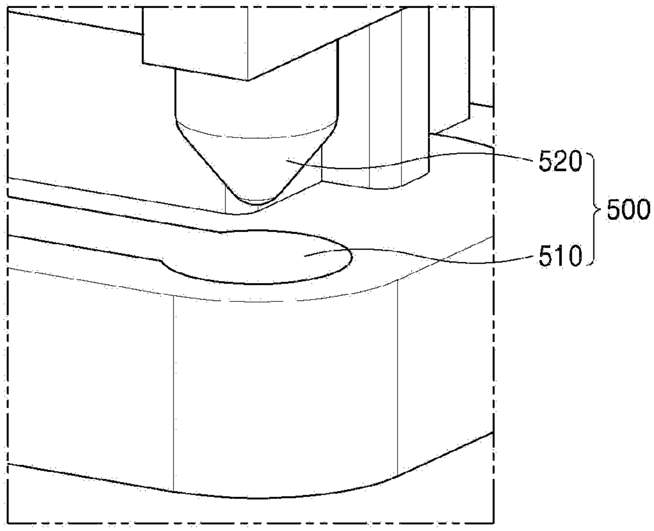
FIG. 11 is a schematic partial perspective view illustrating of a modification of a unit stopper section of a push switch unit for a vehicle according to an embodiment of the present invention.

In addition, in some embodiments, as shown in FIG. 9, the unit stopper corresponding part 510 disposed in a space defined by at least the unit stopper corresponding part-mounting extension part 3233 may form a non-overlapping structure. In other words, the unit stopper corresponding part-mounting part 323 includes: a unit stopper corresponding part-mounting extension part 3233 having a length in the moving direction of the unit switch moving block 320; and a unit stopper corresponding part-mounting confrontation part 3239 and a unit stopper corresponding part-mounting confrontation connection part 3237 formed in an opposite manner such that the unit switch moving block 320 is positioned, and connected to the unit stopper-corresponding part-mounting extension part 3233. The unit stopper corresponding part-mounting confrontation connection part 3237, and the unit stopper corresponding part-mounting confrontation part 3239 and the unit stopper corresponding part-mounting extension part 3233 are non-overlapped with each other when projected onto a plane perpendicular to the moving direction of the unit switch moving block 320.

Figure 29:
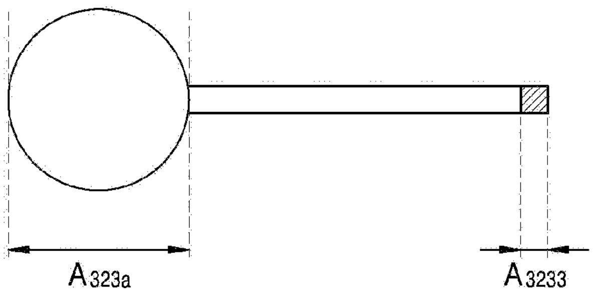
FIG. 29 is a projection diagram illustrating a state in which a unit stopper corresponding part-mounting part of FIG. 9 is protected onto a plane perpendicular to the moving direction of a unit switch moving block.

The unit stopper corresponding part-mounting part 323 is formed in the unit switch moving block base 321 to allow the unit stopper corresponding part 510 to be disposed in the unit stopper corresponding part-mounting part 323. The unit stopper corresponding part-mounting part 323 at least partially includes the unit stopper corresponding part-mounting extension part 3233 having a length in the moving direction of the unit switch moving block 320. The unit stopper corresponding part-mounting extension part 3233 is disposed spaced apart from a region formed by the unit stopper corresponding part-mounting confrontation part 3239 to allow the unit stopper corresponding part-mounting extension part 3233 and the unit stopper corresponding part-mounting confrontation part 3239 to form a structure in which they are non-overlapped with each other when projected onto a plane perpendicular to the moving direction of the unit switch moving block 320 (see FIG. 29), so that the unit stopper corresponding part-mounting extension part 3233 may have a configuration in which it is spaced apart from a position where contact occurs due to frequent operation between the unit stopper 520 and the unit stopper corresponding part 510 and simultaneously has a predetermined length to prevent separation of the unit stopper corresponding part 510 from the unit stopper corresponding part-mounting part 323. In other words, as shown in FIG. 29, a projection region $A_{3239}$ of the unit stopper corresponding part-mounting confrontation part 3239 and a projection region $A_{3233}$ of the unit stopper corresponding part-mounting extension part 3233 may have a configuration in which they are not intersected or overlapped with each other.

In FIGS. 7 to 9, although the arrangement structure of the unit stopper corresponding part-mounting extension part 3233 has either a non-overlapped structure or an intersected structure, in some embodiments, it may be modified in various manners, such as having a configuration of including both the non-overlapped structure and the intersected structure.

Although a structure having one set of the unit stopper and the corresponding part has been described in an embodiment of the present invention, the present invention is not limited thereto and may take configuration in which the unit stopper and the corresponding part are provided in a plurality of sets. In this embodiment, the unit stopper corresponding part 510 is disposed in plural numbers so as to be spaced apart from each other in the unit switch moving block base 321. A plurality of the unit stoppers 520 are disposed at opposite positions of a plurality of the unit stopper corresponding parts 510 to correspond to the unit stopper corresponding parts 510. The unit stopper corresponding part 510 may have a structure in which it is at least partially disposed in the unit switch moving block base 321 in such a manner as to be symmetrically positioned on a plane including the moving direction of the unit switch moving block 320.

Figure 5:
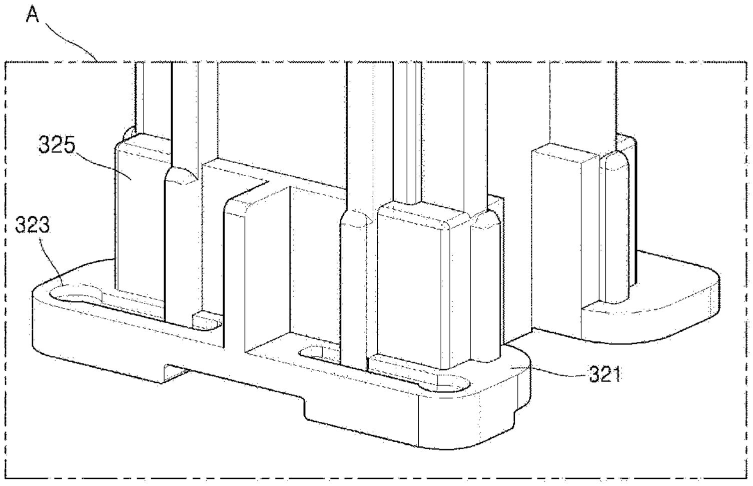
FIG. 5 is a partially enlarged perspective view of a portion A of FIG. 2 illustrating a push switch unit for a vehicle according to an embodiment of the present invention.

In other words, as shown in FIG. 5, the unit stopper corresponding part 510 may have a structure in which it is symmetrically disposed with respect to a virtual plane of a center thereof to prevent or significantly reduce the possibility of occurrence of an erroneous operation according to an increase in use time due to asymmetry, which may occur during a push operation.

Meanwhile, in the previous embodiment, the unit stopper corresponding part-mounting extension parts 3233 symmetrically disposed in the unit switch moving block base 321 through a rib at the center of the end of the unit switch moving block base 321 have a configuration in which they are separated from each other, but are not limited thereto, and may have a shape in which they are connected to each other through a fluidic communication structure. In consideration of an injection speed and an injection pressure of the material injected through the symmetrical communication structure, the injection of the material into the unit stopper corresponding part-mounting part 323 having a symmetrical structure may be stably performed without being biased to any one side, thereby accurately forming the shape of the unit stopper corresponding part 510 through the injected material.

In the meantime, although the symmetric unit stopper-corresponding mounting extension parts 3233 has a symmetrical structure in this embodiment, the fluidic communication structure in which both of the plurality of symmetric unit stopper-corresponding part-mounting extension parts 3233 and the unit stopper-corresponding part 510 disposed therein communicate with each other may be variously modified depending on design specifications.

The unit stopper corresponding part-mounting part 323 includes a unit stopper corresponding part-mounting injection part 3231, a unit stopper corresponding part-mounting extension part 3233, a unit stopper corresponding part-mounting extension connection part 3235, a unit stopper corresponding part-mounting confrontation connection part 3237, and a unit stopper corresponding part-mounting confrontation part 3239. As described above, the unit stopper-corresponding part-mounting injection part 3231 is formed on an opposite surface to a surface of the unit switch moving block base 321, which faces the unit stopper 520 to form an injection structure of injecting an injection material for forming the unit stopper corresponding part 510. In other words, the unit switch moving block base 321 includes the unit stopper corresponding part-mounting part 323 formed therein to allow the unit stopper corresponding part 510 to be disposed in the unit stopper corresponding part-mounting part 323, and the unit stopper corresponding part-mounting part 323 includes the unit stopper-corresponding part-mounting injection part 3231 formed on an opposite surface to one surface of the unit switch moving block base 321, which faces the unit stopper 520. Here, the position of the unit stopper corresponding part-mounting injection part 3231 may be selected at various points depending on the design specification. Although the unit stopper corresponding part-mounting injection part 3231 is formed at the right end side of the stopper corresponding part-mounting part 323 on the drawing sheet of FIG. 7, the injection position of the injection material for forming the unit stopper response part 510 may be modified in various manners depending on design specifications, such as being formed at the left end side or the center of the stopper corresponding part-mounting part 323 on the drawing sheet.

Figure 12:
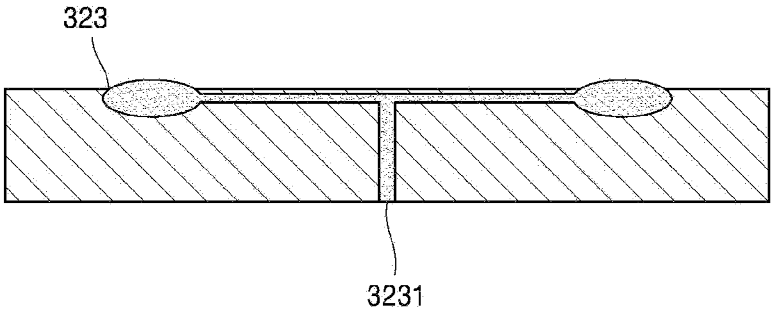
FIGS. 12 and 13 illustrate various modifications of a unit stopper corresponding part-mounting part of a push switch unit for a vehicle according to an embodiment of the present invention.
Figure 13:
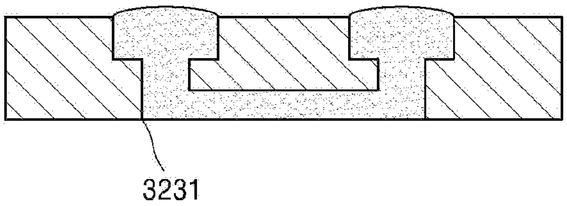

The unit stopper corresponding part-mounting extension part 3233 is connected to the unit stopper corresponding part-mounting injection part 3231 to form at least a part of an element for preventing the unit stopper corresponding part 510 from being separated from the unit stopper corresponding part-mounting part 323 by the injection material disposed therein. The unit stopper corresponding part-mounting confrontation part 3239 forms a structure in which the unit stopper corresponding part 510 is exposed to the outside, and the unit stopper 520 is exposed to the unit stopper corresponding part-mounting confrontation part 3239. As shown in FIG. 12, the unit stopper-corresponding part-mounting injection part 3231 formed on an opposite surface to one surface of the unit switch moving block base 321, which faces the unit stopper 520, may have a structure in which it is formed in the shape of a single narrow injection line at the lower end side of the unit stopper corresponding part-mounting part 323, or may be formed in a wide shape as shown in FIG. 13.

Figure 14:
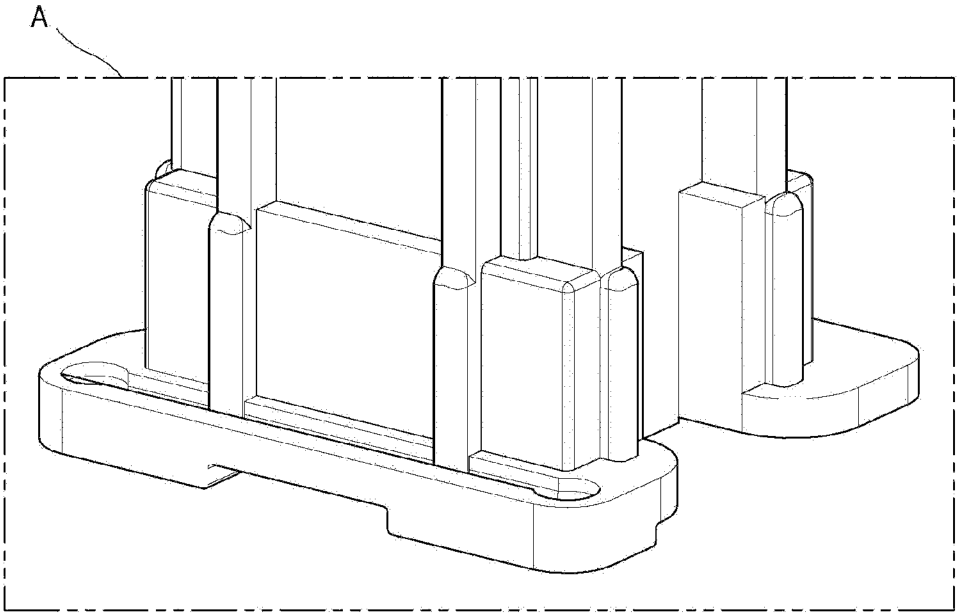
FIG. 14 is a partially enlarged perspective view of a portion A of FIG. 2 illustrating a push switch unit for a vehicle according to an embodiment of the present invention.
Figure 15:
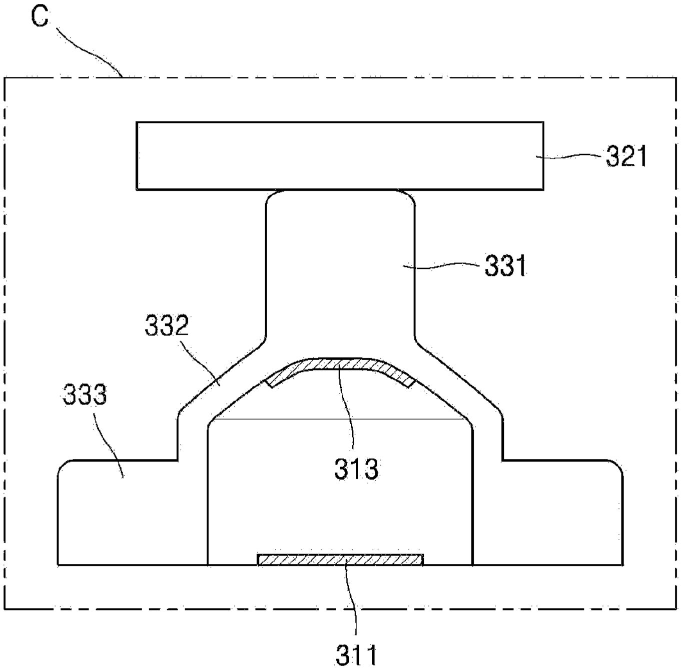
FIG. 15 is a partially enlarged cross-sectional view of a unit switch section of a push switch unit for a vehicle according to an embodiment of the present invention.

In other words, as shown in FIGS. 12 and 14, the unit stopper-corresponding part-mounting injection part 3231 is an injection passageway through which the injection material is injected and fluidically communicates with the unit stopper corresponding part-mounting extension part 3233 in a symmetrical structure, and may have a configuration in which the injection material is vertically commonly injected thereinto and the unit stopper corresponding part-mounting part 323 is symmetrically branched to both sides from one surface where the unit stopper corresponding part 510 is exposed. As shown in FIGS. 13, the unit stopper corresponding part-mounting injection part 3231 and the unit stopper corresponding part-mounting extension part 3233 may have a structure in which they are formed extending at the lower end side of the unit stopper corresponding part-mounting part 323 and the stopper corresponding part-mounting confrontation connection part 3237 and the unit stopper corresponding part-mounting confrontation part 3239 are separately formed extending upwardly from both ends of the unit stopper corresponding part-mounting extension part 3233. By virtue of such a structure, a reduction in the number of the material injection position through the fluidic communication structure can further improve a degree of design freedom of the injection molding process.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the scope of protection of the present invention should be interpreted by the appended claims, and it should be interpreted that all technical spirits within the scope equivalent to the claims fall within the scope of the present invention.

INDUSTRIAL APPLICABILITY

The vehicle push switch unit of the present invention has a configuration in which it is particularly implemented as a shift range selector switch for a vehicle, but may be modified in various manners, such as being implemented as a switch of another output unit within the scope of controlling the operation of other devices of the vehicle or as a switch for other devices other than the vehicle.

The invention claimed is:

1. A push switch unit (10) for a vehicle, comprising:

a unit housing (100);

a unit switch section (300) including a unit switch moving block (320) movably mounted in the unit housing (100), and a unit switch (310) for changing a switching operation signal in response to the movement of the unit switch moving block (320); and a unit stopper section (500) provided at the unit switch moving block (320) and the unit housing (100), wherein the unit stopper section (500) is at least partially injection-molded, wherein the unit stopper section (500) comprises:

a unit stopper (520) disposed within the unit housing (100); and a unit stopper corresponding part (510) disposed at the unit switch moving block (320) so as to correspond to a position of the unit stopper (520), wherein the unit stopper corresponding part (510) is injection-molded, wherein the unit switch moving block (320) comprises:

a unit switch moving block body (325) movably disposed within the unit switch section (300); and a unit switch moving block base (321) disposed at an end of the unit switch moving block body (325) to move the unit switch (310), wherein the unit stopper corresponding part (510) is disposed in the unit switch moving block base (321), wherein the unit switch moving block base (321) comprises a unit stopper corresponding part-mounting part (323) formed therein, and wherein the unit stopper corresponding part-mounting part (323) at least partially comprises a unit stopper corresponding part-mounting extension part (3233) having a length in a direction intersecting a moving direction of the unit switch moving block (320).

2. The push switch unit (10) for a vehicle according to claim 1, wherein the unit stopper corresponding part (510) is disposed in the unit stopper corresponding part-mounting part (323).

3. The push switch unit (10) for a vehicle according to claim 1, wherein the unit stopper corresponding part (510) is disposed in the unit stopper corresponding part-mounting part (323), wherein the unit stopper corresponding part-mounting part (323) further comprises:

a unit stopper corresponding part-mounting extension part (3233) having a length in the moving direction of the unit switch moving block (320); and a unit stopper corresponding part-mounting confrontation part (3239) formed in an opposite manner such that the unit switch moving block (320) is positioned, and connected to the unit stopper-corresponding part-mounting extension part (3233), and wherein the unit stopper corresponding part-mounting confrontation part (3239) and the unit stopper corresponding part-mounting extension part (3233) are non-overlapped with each other when projected onto a plane perpendicular to the moving direction of the unit switch moving block (320).

4. The push switch unit (10) for a vehicle according to claim 1, wherein the unit stopper corresponding part (510) is disposed in plural numbers so as to be spaced apart from each other in the unit switch moving block base (321).

5. The push switch unit (10) for a vehicle according to claim 1, wherein the unit stopper corresponding part (510) is at least partially disposed in the unit switch moving block base (321) in such a manner as to be symmetrically positioned on a plane including the moving direction of the unit switch moving block (320).

6. The push switch unit (10) for a vehicle according to claim 5, wherein the unit stopper corresponding part (510) is at least partially disposed in the unit switch moving block base (321) in a fluidic communication manner.

7. The push switch unit (10) for a vehicle according to claim 1, wherein the unit stopper corresponding part-mounting part (323) further comprises a unit stopper-corresponding part-mounting injection part (3231) formed on an opposite surface to one surface of the unit switch moving block base (321), which faces the unit stopper corresponding part (510).

8. The push switch unit (10) for a vehicle according to claim 1, wherein the unit switch (310) comprises:

a unit switch fixed part (311) disposed on a unit substrate (200); and a unit switch movable part (313) configured to be moved to a position corresponding to the unit switch fixed part (311) by the unit switch moving block (320).

9. The push switch unit (10) for a vehicle according to claim 8, wherein the unit substrate (200) allows a unit rubber pad (301) to be disposed on a surface thereof, wherein the unit switch (310) comprises:

a unit switch movable contact (331) configured to be contactable with the unit switch moving block base (321);

a unit switch movable support (333) disposed on the unit rubber pad (301); and a unit switch movable connection (332) contactingly connected at one end thereof to the unit switch movable contact (331) and at another end thereof to the unit switch movable support (333), and wherein the unit switch movable part (313) is disposed at an inner bottom end of the unit switch movable contact (331).

10. The push switch unit (10) for a vehicle according to claim 1, wherein the unit stopper corresponding part (510) comprises:

a unit stopper corresponding contact (511) configured to be contactable with the unit stopper (520);

a unit stopper corresponding extension (513) disposed at a side opposite to the unit stopper corresponding contact (511); and a unit stopper corresponding contact connection (515) configured to interconnect the unit stopper corresponding contact (511) and the unit stopper corresponding extension (513).

11. The push switch unit (10) for a vehicle according to claim 10, wherein the unit stopper corresponding contact (511) and the unit stopper corresponding extension (513) have a projection region different from a projection region of the unit stopper corresponding contact connection (515) when projected onto a plane perpendicular to the moving direction of the unit switch moving block (320).

12. The push switch unit (10) for a vehicle according to claim 1, wherein the unit stopper corresponding part-mounting part (323) at least partially has a length in a direction parallel with the moving direction of the unit switch moving block (320).

13. A method of manufacturing a push switch unit for a vehicle, wherein the push switch unit comprises: a unit housing (100); a unit switch section (300) including a unit switch moving block (320) movably mounted in the unit housing (100), and a unit switch (310) for changing a switching operation signal in response to a movement of the unit switch moving block (320); and a unit stopper section (500) provided at the unit switch moving block (320) and the unit housing (100), and wherein the unit stopper section (500) is at least partially injection-molded, wherein the unit stopper section (500) comprises:

a unit stopper (520) disposed within the unit housing (100); and a unit stopper corresponding part (510) disposed at the unit switch moving block (320) so as to correspond to a position of the unit stopper (520), and wherein the unit stopper corresponding part (510) is injection-molded;

the method further comprising:

a first injection molding step of forming a unit stopper corresponding part-mounting part (323) in a unit switch moving block base (321) of the unit switch moving block (320); and a second injection molding step of injecting a material for forming the unit stopper corresponding part (510) into the unit stopper corresponding part-mounting part (323).

14. The method according to claim 13, wherein the unit stopper corresponding part (510) formed through the first injection molding step and the second injection molding step comprises:

a unit stopper corresponding contact (511) configured to be contactable with the unit stopper (520);

a unit stopper corresponding extension (513) disposed at a side opposite to the unit stopper corresponding contact (511), and having a projection region different from a projection region of the unit stopper corresponding contact (511) when projected onto a plane perpendicular to a moving direction of the unit switch moving block (320); and a unit stopper corresponding contact connection (515) configured to interconnect the unit stopper corresponding contact (511) and the unit stopper corresponding extension (513), and wherein the first injection molding step comprises:

a first injection molding block disposition step of arranging a first injection molding block that forms at least a part of the unit stopper corresponding extension (513) and the unit stopper corresponding contact connection (515);

a second injection molding block disposition step of arranging a second injection molding block that at least forms the unit stopper corresponding contact (511); and a third injection molding block disposition step of arranging a third injection molding block at a position where the unit stopper corresponding contact (511) is formed so as to at least partially abut against the first injection molding block and the second injection molding block.

15. The method according to claim 14, wherein in the second injection molding step, the third injection molding block is disposed at a partitioning position to define a space of the unit stopper corresponding contact (511).

16. A method of manufacturing a push switch unit, wherein the push switch unit comprises: a unit housing (100); a unit switch section (300) including a unit switch moving block (320) movably mounted in the unit housing (100), and a unit switch (310) for changing a switching operation signal in response to the movement of the unit switch moving block (320); and a unit stopper section (500) provided at the unit switch moving block (320) and the unit housing (100), wherein the unit stopper section (500) is at least partially injection-molded, wherein the unit stopper section (500) comprises:

a unit stopper (520) disposed within the unit housing (100); and a unit stopper corresponding part (510) disposed at the unit switch moving block (320) so as to correspond to a position of the unit stopper (520), and wherein the unit stopper corresponding part (510) is injection-molded;

the method further comprising:

a first injection molding step of forming a unit stopper corresponding part-mounting part (323) in a unit switch moving block base (321) of the unit switch moving block (320); and a second injection molding step of injecting a material for forming the unit stopper corresponding part (510) into the unit stopper corresponding part-mounting part (323).

* * * * *